Figures 1, 2:
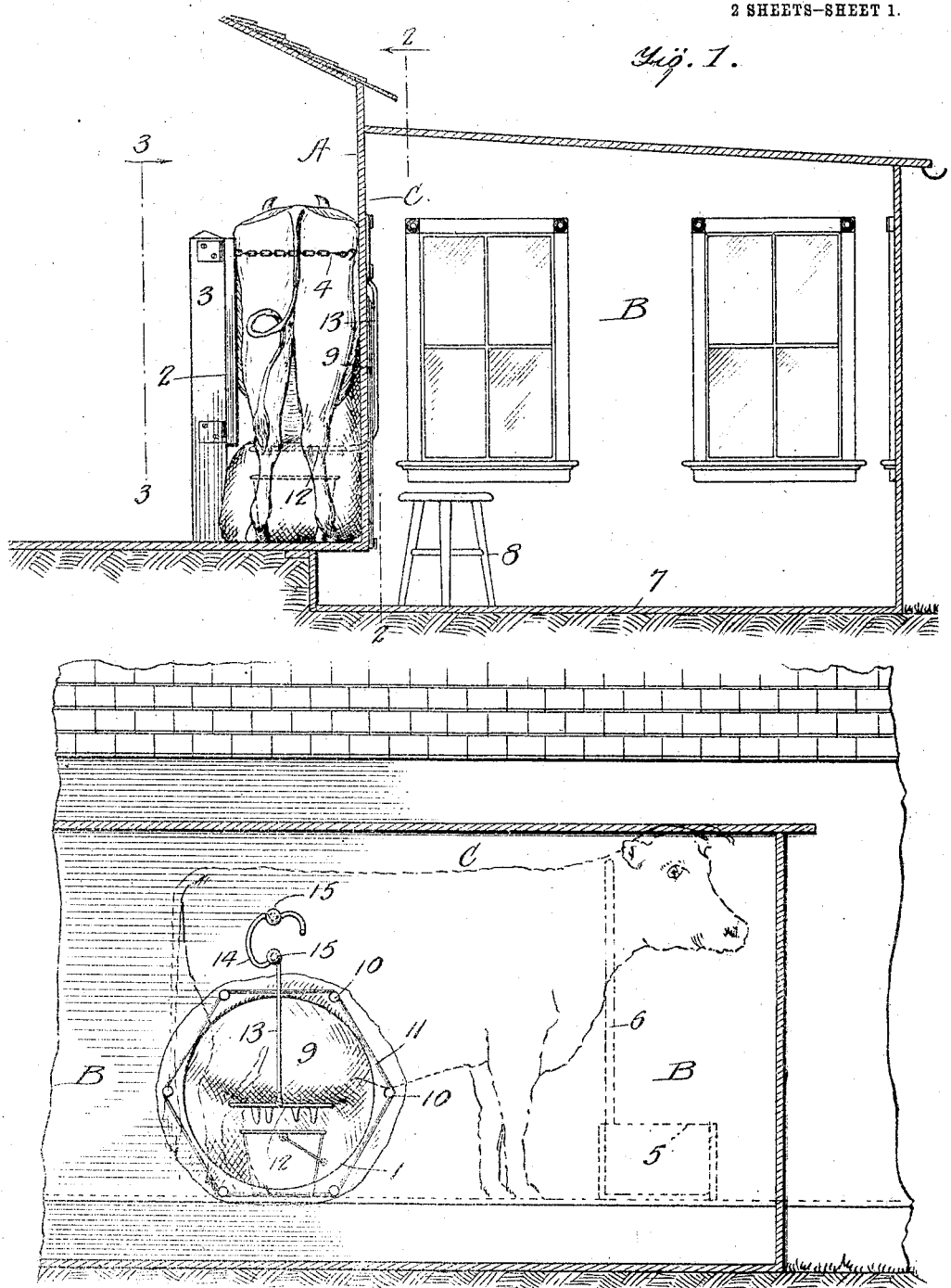

G. M. LUMMIS.
SANITARY STRUCTURE AND APPLIANCE FOR USE IN COW MILKING.
APPLICATION FILED AUG. 3, 1911.

1,025,955.

Patented May 7, 1912.

2 SHEETS—SHEET 1.

WITNESSES

INVENTOR
GEORGE M. LUMMIS,
BY Munn & Co.
ATTORNEYS

G. M. LUMMIS.
SANITARY STRUCTURE AND APPLIANCE FOR USE IN COW MILKING.
APPLICATION FILED AUG. 3, 1911.
1,025,955.
Patented May 7, 1912.
2 SHEETS—SHEET 2.
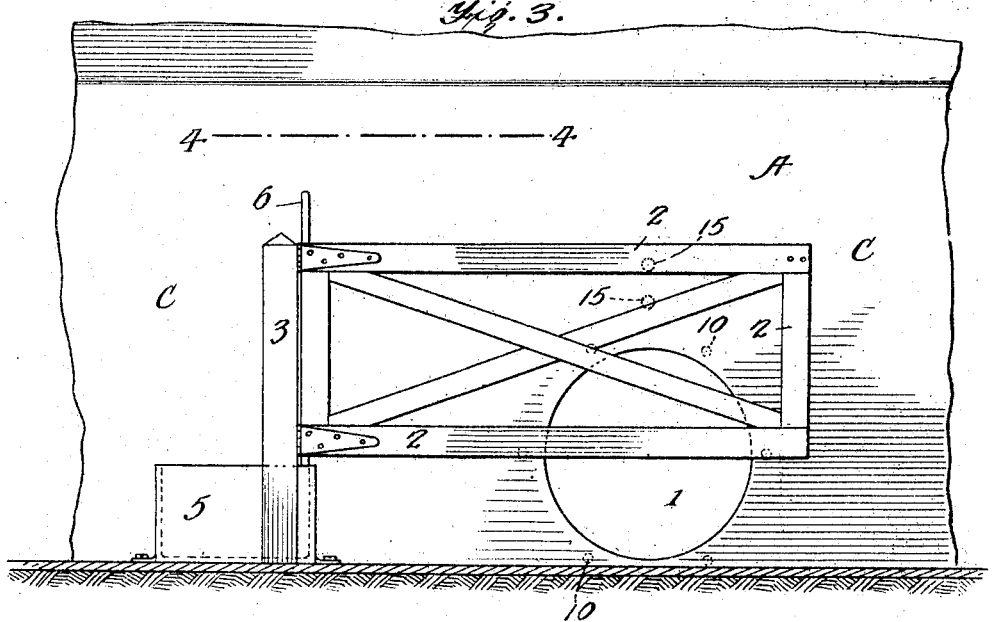
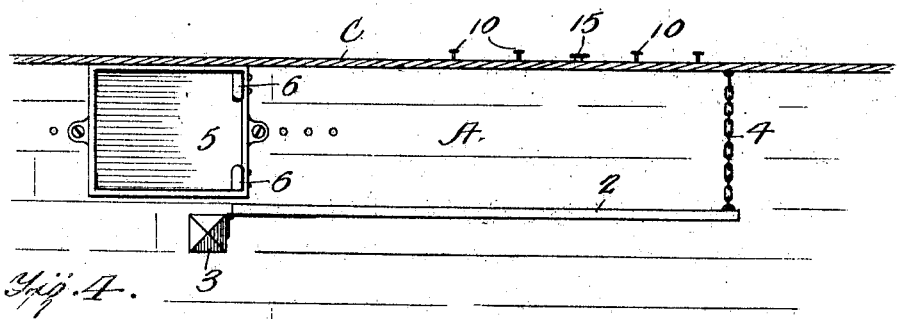
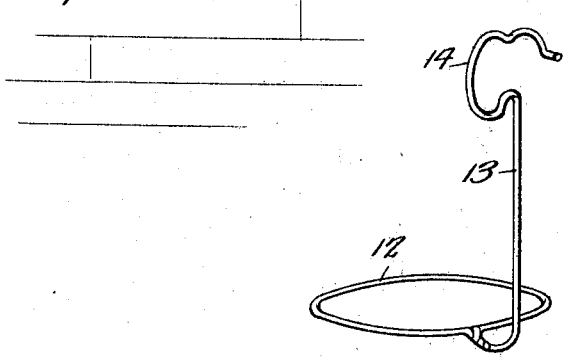
WITNESSES
INVENTOR
GEORGE M. LUMMIS,
BY
ATTORNEYS

UNITED STATES PATENT OFFICE.

GEORGE M. LUMMIS, OF FORT MYERS, FLORIDA.

SANITARY STRUCTURE AND APPLIANCE FOR USE IN COW-MILKING.

1,025,955.  Specification of Letters Patent.  Patented May 7, 1912.

Application filed August 3, 1911. Serial No. 642,135.

*To all whom it may concern:*

Be it known that I, GEORGE M. LUMMIS, a citizen of the United States, and a resident of Fort Myers, in the county of Lee and State of Florida, have invented certain Improvements in Sanitary Structures and Appliances for Use in Cow-Milking, of which the following is a specification.

The object of my invention is to provide sanitary conditions in the operation of milking cows. I employ a structure which constitutes an inclosure for cows while being milked, whereby dandruff, loose hairs, or dirt from the udder, flanks, and body of the cow are prevented from access to the milk-pail or bucket, and whereby even the contaminated atmosphere of the cow stable is excluded from the apartment or locality where the milker is stationed. Or, more definitely stated, I provide a vertical partition which is interposed between the cow and the milker; and construct the same with a large opening over and in which a flexible screen or protector formed of rubber, skin, or fabric, and having holes for insertion of the cow's teats, is applied in such manner as to completely exclude foreign substances from access to the milk-pail or bucket. It will thus be understood that, in place of taking a milk-pail or bucket or milking machine to a cow when tied in the open or in a stable, the cow is taken to a particular sanitary structure and is confined therein during the milking operation.

The details of construction of the apparatus are as hereinafter described and illustrated in the accompanying drawings, in which—

Figure 1 is a cross section of a cow stall or stable and an adjoining compartment in which the milker is located. Fig. 2 is a vertical longitudinal section of the milking compartment, the same being taken on the line 2—2 of Fig. 1. Fig. 3 is a vertical longitudinal section of the cow stall on the line 3—3 of Fig. 1. Fig. 4 is a horizontal section on the line 4—4 of Fig. 3. Fig. 5 is a perspective view of the movable temporary support for the flexible screen or protector during the milking operation.

In Figs. 1-4, A indicates the cow stall or stable, B the adjoining milking compartment, and C the vertical partition that intervenes them. This partition is provided at 1 with an opening of considerable size—see especially Fig. 3—and when a cow is driven into the stall or stable she occupies such position that her udder is directly opposite the central or upper portion of such opening. Parallel to the partition C I provide a swinging gate 2 which is hinged to a vertical post 3 and provided at the rear end with a chain 4, which, during the milking operation, holds the partition in the position indicated in Fig. 1 and which thus prevents any considerable lateral movement of the cow away from the partition. A manger or feed-box 5 may be located at the head of the stall and the cow may be secured at that point by a stanchion 6 or any other convenient means. The partition C thus forms one side of a stall A and one side of the adjacent milking compartment B. The bottom or floor 7 of the latter is located considerably below the level of the stall, as shown in Fig. 1, so that the milker seated upon a stool 8 has easy or convenient access to the udder of the cow through the opening 1. In order to prevent foreign substances from the cow or stall from passing through the opening 1 during the milking operation, I employ a screen or protector 9 which is preferably formed of flexible material, such as rubber, skin, or fabric, the same being secured to the compartment side of the partition, around the edges of the opening 1, and having a sufficient slack or fullness in the central portion to permit it to be pushed laterally into the stall and under the cow's udder. This protector is provided with four openings of a size suitable to receive the cow's teats, and thus the only portion of the cow which is visible or accessible to the milker is the teats, and these he reaches through the opening 1 and directs the streams of milk therefrom into a pail or bucket which is introduced through the opening 1 and placed directly beneath the cow's udder, as shown in Figs. 1 and 2.

A convenient means for holding the protector is illustrated in Fig. 2. That is to say, a series of nails 10 are driven into the partition C at points adjacent to and surrounding the opening 1, and the edges of the fabric 9 being placed over these nails, a wire 11, under tension, is run over the nails and also over the fabric whereby the latter is held with due security. It is obviously necessary that a suitable support shall be provided for that portion of the protector 9 which is provided with openings for the cow's teats, and for this purpose I employ the device illustrated in Figs. 2 and 5, the same consisting of a circular wire band 12 attached to a pendent rod or stout wire 13 and terminating at its upper end in a hook 14 which is adapted to be hung over and engage two headed nails 15, which, as shown in Fig. 2, are driven into the partition C just above the opening 1. The ring being horizontal or at right angles to the suspending rod 13, it is obvious that it may be applied, as shown in Fig. 2, in such manner as to encircle the teats and support the portion of the protector that receives them. It is apparent that this support is applied or adjusted in place after a cow has been driven into the stall and that it must be detached before she can be removed from the stall.

It will be seen that the partition or wall C separates the milking room or compartment from the cow's stall or stable and with the protector completely prevents the passage of any foreign substances from the cow or the stable into the milk pail or bucket. It is a matter of importance that these means also prevent access of unsanitary atmosphere to the milk, so that the latter is not contaminated in that way, as usual in the ordinary process of milking either by hand or by machine. The same means also prevent any contact of the milker's hands or clothing with any portion of the cow save the teats. Flies or other insects in the stable are likewise prevented from access to the milk or bucket.

The location of the floor 7 of the milking compartment below that of the stable is a matter of importance, since it permits the milker to sit in a natural or uncramped position while milking.

What I claim is:—

1. A sanitary apparatus for use in milking cows, comprising a vertical wall provided with an opening and a flexible protector secured to said wall around the opening therein, the middle portion of the protector having sufficient slack to permit it to be thrust through said opening and applied to the udder of a cow, and provided with openings for receiving the teats of the animal, and a horizontal support for such middle portion of the protector, as shown and described.

2. A sanitary apparatus for use in milking cows, comprising a vertical wall provided with an opening, a flexible protector having holes for reception of the animal's teats and adapted to be secured to the wall around the opening therein, and means attached to a suitable support and projecting through the opening and adapted to support the protector in contact with the udder of the animal, substantially as described.

3. A sanitary apparatus for the use specified, comprising a vertical wall provided with an opening, a flexible protector having holes for reception of the animal's teats and adapted to be secured to the wall along the opening and constructed with sufficient slack or fullness to adapt it to be protected through the opening, and a device for supporting the protector against the udder of the cow, the same comprising a ring attached to and arranged at right angles to a vertical rod, and means for securing the rod detachably to the wall in pendent position, substantially as described.

4. In a sanitary apparatus for the purpose specified, the combination with a vertical wall having an opening therein, of a flexible protector comprising a fabric or equivalent having sufficient fullness to adapt it for projection through the opening and provided with holes for reception of the animal's teats, headed nails inserted in the wall around the opening over which the edge of the protector is laid, and a wire arranged over such edge and engaging the heads of the nails, whereby the protector is secured detachably in place for use in the milking operation, substantially as described.

GEORGE M. LUMMIS.

Witnesses:
S. L. BARTLESON,
F. E. BARTLESON.